United States Patent Office 3,105,009
Patented Sept. 24, 1963

3,105,009
ANTI-MITOTIC CHEMOTHERAPEUTIC
COMPOUNDS
Eugene Roberts, Monrovia, Calif., assignor to United
States Rubber Company, New York, N.Y., a corporation of New Jersey
No Drawing. Filed Oct. 30, 1959, Ser. No. 849,950
23 Claims. (Cl. 167—65)

This invention relates to treatment of malignant tumor cells and more particularly to the inhibition of mitosis in malignant tumor cells and the prevention of synthesis of desoxyribonucleic acid.

The invention has not yet been proven clinically in humans.

Heretofore, no compound or group of compounds has been completely effective in interrupting the metabolism of tumor cells. Particularly, no compound or group of compounds has been developed that both (1) inhibit further mitosis of tumor cells which are already in a state of mitotic division, or prevents the resting tumor cells or inner phase tumor cells from progressing into a phase of mitosis, such as the prophase, and (2) in addition prevents the synthesis of desoxyribonucleic acid which is necessary for the continuing existence of any cell whether normal or cancerous.

It is therefore an object of this invention to inhibit the mitosis of tumor cells.

It is a further object of this invention to interrupt the synthesis of desoxyribonucleic acid in tumor cell metabolism.

It is another object of this invention to provide new compositions of matter containing pharmaceutical preparations of maleuric acid and synergistic combinations of maleuric acid with an adjuvant antimitotic compound, which are effective in inhibiting the mitosis of malignant tumor cells and causing a partial or total decay thereof.

This invention relates to the use of maleuric acid and compositions of maleuric acid in inhibiting mitosis of tumor cells and interrupting the synthesis of desoxyribonucleic acid in tumor cell metabolism. It has been found that pharmaceutical preparations of maleuric acid and synergistic compositions of maleuric acid with an adjuvant anti-mitotic compound are effective to arrest the growth of tumor cells and cause a partial or total decay thereof. Particularly, it has been found that when maleuric acid is used in combination with anti-mitotic compounds selected from the group consisting of alkylating agents, antimetabolites, hormones and steroid compounds, and antibiotics and natural products, that a synergistic effect is obtained, providing a greater arrest of mitosis of malignant tumor cells than the use of either compound alone.

Maleuric acid has a low toxicity level and therefore large dosages may be utilized in treating tumor-infected warm-blooded animals.

It has been found that maleuric acid possesses a median tolerated level of approximately 250 milligrams per kilogram of animal weight, which is the maximum dosage that will be safely tolerated for any particular animal without toxic side effects. The particular dosage which will represent an aptimum for any type of tumor cell will vary with the nature of the tumor, the location in the warm-blooded animal host, and its advanced state of tumor development. In general, tests have to be conducted on the host to determine all these factors and an independent conclusion reached as to a particular dosage. Thus, if the host is suffering from another disease concurrent with the cancer, the administration of a particular dose will depend upon the nature of the other disease. Likewise, it is preferable to give smaller doses in some areas of the body which metabolize the maleuric acid less rapidly than other parts. Generally, however, it has been found desirable to administer from about 50 milligrams to about 250 milligrams of maleuric acid per kilogram of body weight of the animal host. Administration may be with the aid of a pharmaceutical carrier. Normally a liquid pharmaceutical carrier is preferred, however, it is possible to use any of the inert pharmaceutical carriers known to the art. Preferred liquid carriers of maleuric acid include water, saline, glycerin, carboxymethyl cellulose, peanut oil, sesame oil, propylene glycol and other water-like solvents.

Combinations of maleuric acid and other antimitotic compounds have also been proven to be synergistically effective in inhibiting mitosis of tumor cells. Examples of anti-mitotic compounds, which fall within the classes of alkylating agents, anti-metabolites, hormones and steroid compounds, and antibiotics and natural products, useful for combined treatment with maleuric acid, are described in Chemical and Engineering News, October 12, 1959, page 53 et seq., which is expressly incorporated herein by reference. Compounds of these types which are preferred for use in combination with maleuric acid are 2,5-di-n-propoxy-3,6-bis-ethyleniminobenzoquinone; diethylamine, 2,2'-dichloro-N-methyl, N-oxide, hydrochloride; gamma-L-glutamylhydrazide; 1-aminocyclohexane carboxylic acid; diazo-acetyl-L-serine; 1,4-dimethanesulfoxy-1,4-dimethylbutane; isonicotinic hydrazide; 6-mercaptopurine, and 2-methylenecyclopentanone-3-carboxylic acid.

In general the dosages which are most appropriate for combinations of maleuric acid with other anti-mitotic compounds will depend upon the toxicity of the other anti-mitotic compound and particular environmental conditions inherent in the warm-blooded animal, as discussed above. The maximum limitations on the dosage of compositions is set by the toxicity of each of the individual compounds. Whereas a synergistic effect is obtained in inhibiting mitosis of malignant tumor cells, no synergism of toxicity has been observed. Therefore, appropriate dosages will be based upon toxicity of the individual compound and maleuric acid.

The mechanism of action of maleuric acid and combinations of maleuric acid in arresting mitosis of malignant tumor cells is not specifically known due to the lack of general knowledge regarding the nature of either normal cells or tumor cells. Experimental results, however, seem to suggest that maleuric acid and combinations thereof act in a multiple fashion. It is postulated that the action causes metabolic processes involving (1) inhibiting the resting or interphase cells from entering into a mitotic stage of development or, (2) inhibiting mitosis after the interphase cells have entered the prophase or the first stage of mitotic division, and, (3) inhibiting the synthesis of desoxyribonucleic acid.

The specific activity of maleuric acid in each of the above mechanisms of reaction is thought to depend upon the steric configuration of maleuric acid when compared to the chemical entities which are important in causing cell metabolism. Desoxyribonucleic acid is essential to cell metabolism and consequently the interruption of the synthesis of this essential nucleic acid will cause the cell to cease its normal metabolic processes. Many metabolic routes are possible in the overall synthesis of desoxyribonucleic acid. The effective blocking of a preferred route would result in an overall inhibition or effective decrease in the metabolism of this essential nucleic acid. One of the important intermediate compounds or precursors of desoxyribonucleic acid is orotic acid, the structure of which is given below together with that of maleuric acid.

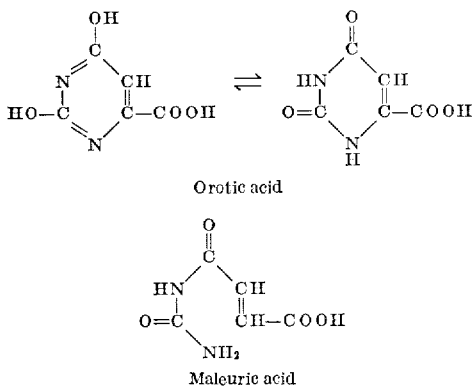

Since maleuric acid as seen above bears a definite structural and chemical similarity to orotic acid, it is postulated that, if maleuric acid is given in sufficient quantities to upset the equilibrium of orotic acid with its next precursor, the further synthesis of desoxyribonucleic acid will be inhibited by providing an abnormal intermediate. Instead of the orotic acid further progressing in desoxyribonucleic acid metabolism to form an orotic acid ribotide, maleuric acid will preferentially react to the exclusion of orotic acid and form an abnormal derivative which thereafter either prevents further synthesis of desoxyribonucleic acid or forms a nonessential nucleic acid analogue of desoxyribonucleic acid.

In a similar manner, maleuric acid probably reacts preferentially in place of the precursor thymidine. This is again due presumably to the similar steric configurations of thymidine and maleuric acid.

It has long been known that glutamine plays an important part in all cell metabolism including the process of cell division. It has been found that the glutamine level in tumor cells is significantly lower than in normal cells, suggesting that the additional glutamine must be supplied either from normal cells or other sources which are capable of supplying glutamine to the blood stream, and thus, to the tumor cells. It may be hypothesized that if a chemical similar to glutamine is supplied to the blood stream, a preferential absorption of this chemical may occur in the tumor cell to the total or partial exclusion of any absorption of glutamine, and also that this chemical may prevent diffusion of glutamine from normal body cells. The use of maleuric acid as a glutamine antagonist is suggested by the similarity in steric configuration of the two molecules. As before shown cytological changes and protein interactions are influenced by steric considerations. The steric configurations of glutamine and maleuric acid based on bond angles and bond lengths and as shown by molecular models may be shown diagrammatically as follows:

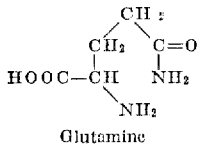

Glutamine

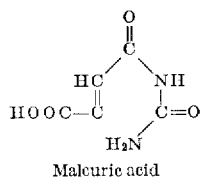

Maleuric acid

The steric configurations of maleuric acid and glutamine are sufficiently similar that, if maleuric acid is present in sufficient concentration, it may react to the substantial exclusion of glutamine to form modified chemical reaction products which are ineffective in causing or participating in the processes of cell division. This results in the eventual control or destruction of tumor or malignant cells.

The following examples are given to more fully illustrate the principles of this invention.

EXAMPLE 1

The physiological effects of maleuric acid on animals was studied by injecting Ehrlich ascites tumor cells into C-57 black mice. C-57 black mice are inbred strains of mice with known incidence of cancer and in which the inheritance of cancer from one generation to the next can be accurately predicted. These were developed by C. C. Little and have a very low incidence of mammary and pulmonary tumors. Ehrlich ascites tumor cells are a particular type of tumor cell which is obtained from the exudate accumulation in the peritoneal cavity which contains a large proportion of tumor cells and approaches the state of a nearly pure culture. Forty C-57 black mice were injected with an amount of ascitic fluid containing approximately $5 \times 10^6$ Ehrlich tumor cells. The tumor cells were permitted to grow in the mice for five days to allow the tumor cells to become accustomed to their immediate environment and undergo normal neoplastic transformation in the host. This concentration of tumor cells is sufficient to cause death of the animal in 10 to 20 days and represents a dosage permissive of obtaining the most significant figures on mitotic rate. Five days after injection of the tumor cells, dosages of from 2 milligrams to 6 milligrams of maleuric acid contained in 0.5 milliliter of physiological saline were injected intraperitoneally into the C-57 black mice; 2 milligram doses were injected into six mice, 3 milligram doses into 24 mice, 4 milligram doses into 4 mice, 5 milligram doses into 3 mice and 6 milligram doses into 3 mice. Samples of ascites tumor cells were removed at various regular intervals by peritoneal puncture, squashed with acetic dahlia and examined cytologically.

The following description of sequential cytological changes was observed in each of the mice receiving the above dosages:

*30 minutes.*—Generally, both interphase or resting cells and dividing cells showed visible signs of damage within thirty minutes after injection of maleuric acid. There was a striking decrease in the number of dividing normal-appearing tumor cells with severe distortion of the cytoplasm due to blebbing in the abnormal-appearing tumor cells.

*1 hour.*—Within one hour, no normal tumor cell mitosis was observed, the percent of mitotic frequency being substantially zero. This effect persisted for varying time intervals, depending on the dosage, longer times being obtained at the higher dosage levels. Marked disintegration of tumor cells, however, was observed with almost all of the mitotic cells; stickiness and clumping of chromosomes or other degenerative changes being observed which appeared to increase progressively with time. Agglutination of the chromatin material at metaphase appeared to be especially marked.

*2–3 hours.*—After two to three hours, clumping was observed between the sticky chromosomes at anaphase while the cytoplasm of cells in the metaphase formed a mutual adherence with clumped chromosomes resulting in ring-like arrangements. In addition to the above described chromosome aberrations, numerous micronuclei were observed at both anaphase and telophase.

ant mitotic frequency. The results are summarized below in Table I.

*Table I*

| | Number of injections | Time interval (hours) between injections | Initial dosage (mg./kg.) | additional dosages (mg./kg.) | Percent mitotic frequency of normal-appearing tumor cells | Time interval (hours) required to cause maximum regression in mitosis of normal-appearing tumor cells | Maximum percent mitotic frequency of abnormal appearing tumor cells | Minimum percent mitotic frequency of abnormal appearing tumor cells | Approximate time interval (hours) required to reach minimum mitotic frequency | Number of mice used |
|---|---|---|---|---|---|---|---|---|---|---|
| Control No. 1 | | | | | [1] 3.8 [2] 7.3 | | | | | 1 |
| Control No. 2 | | | | | [1] 2.7 [2] 8.2 | | | | | 1 |
| Maleuric acid | 1 | | 150 | | 3.9 | 1 | 2.5 | 0.2 | 24 | 33 |
| Do | 1 | | 250 | | 3.9 | 0.5 | 3.9 | 0.9 | 6 | 27 |
| Do | 2 | 6 | 100 | 1 x 100 | 4.8 | 3 | 5.7 | 0.1 | 13 | 1 |
| Do | 2 | 3 | 100 | 1 x 200 | 5.2 | 4 | 2.75 | 0.1 | 10 | 2 |
| Do | 4 | 12 | 150 | 3 x 50 | 5.1 | 3 | 3.9 | 0.4 | 12 | 1 |
| Do | 6 | 12 | 150 | 1 x 50 | 5.2 | 6 | 12.0 | 1.5 | 6 | 7 |
| Do | 8 | 24 | 150 | 3 x 50 / 3 x 100 / 1 x 150 | | | 2.1 / 3.8 | 1.5 / 1.5 | 48 | 15 |
| Do | 8 | 24 | 150 | 3 x 50 / 3 x 100 / 1 x 150 | | | 2.0 | 1.5 | | 15 |

[1] Minimum. [2] Maximum.

*4–6 hours.*—At four to six hours, the total number of mitotic cells observed was very small. However, those which were observed possessed the previously described cytoplasmic abnormalities.

*6 hours.*—After six hours, there was a gradual increase in the number of dividing cells for both the normal-appearing and abnormal-appearing tumor cells.

*12 hours.*—After twelve hours, the resting or interphase cells showed a normal appearance.

*24 hours.*—The mitotic frequency of the normal-appearing tumor cells remained below the level of controls, even after twenty-four hours.

Although these marked cytoplasmic and nuclear abnormalities were obtained, the amino acid content of the tumor cells remained essentially the same; paper chromatographic determinations of free amino acids in alcoholic extracts of the tumor cells and ascitic fluid showed no detectable differences between experimental and control samples.

EXAMPLE 2

The lethal dose of maleuric acid was obtained by injecting various amounts of maleuric acid in normal mice. The $LD_{50}$ in normal mice for a single intra-peritoneal injection averaged approximately 775 milligrams per kilogram of body weight. Specifically it was found that if maleuric acid was given in 5–10% solution, the $LD_{50}$ was 850 mg./kg., and if given as a 1% solution the observed median lethal dose was an $LD_{50}$ of 700 mg./kg.

In combination studies of the anti-mitotic synergism of maleuric acid with other known carcinostatic or anti-tumor chemotherapeutic compounds, the median lethal dosages of the chemicals were approximately independent of each other; that is, the median lethal doses of each chemical were not cumulative and very little synergism of toxicity was obtained. This allows an independent calculation of toxic dosages in any single injection based on the toxicity values of each contributing anti-mitotic compound. The $LD_{50}$ values of each of the chemotherapeutic compounds used in combination with maleuric acid were published in the chemical literature. In all experiments the dosage of the anti-mitotic compound was below that of the $LD_{50}$.

EXAMPLE 3

This example describes the effect of varying the amount of maleuric acid and times of treatment with the results There is a definite relationship between the dose of maleuric acid and its degree of effectiveness on the tumor cells. Doses of 50 milligram per kilogram of animal body weight to 100 milligram per kilogram produced slight but visible effects which lasted for relatively short periods of time. Treatment with minimal doses, such as these, are preferred when it is desired to give frequent doses over an extended period of time. Increasing the dosage of maleuric acid to 150 milligrams per kilogram of animal body weight increased anti-mitotic activity considerably and caused abnormalities in the mitotic tumor cells, such as agglutination of the chromosomes, sticking and clumping of individual cells and formation of micronuclei. Frequently these abnormalities were observed to last as long as twenty-four to forty-eight hours after injection of the maleuric acid into the peritoneal cavity of the animal. Further increasing the dosage of maleuric acid to 250 milligrams per kilogram of body weight significantly prolonged the effectiveness of maleuric acid as an anti-mitotic and caused abnormalities in the cytoplasm of non-mitotic cells.

EXAMPLE 4

Combinations of maleuric acid with other known anti-tumor drugs was tested for synergistic action on an Ehrlich ascites tumor (hypotetraploid strain) transplanted serially into C–57 black mice and Ha/ICR Swiss mice. Maleuric acid was tested for its synergistic effect with 2-methylene-cyclopentanone-3-carboxylic acid (sarkomycin); 2-5-di-n-propoxy-3,6-bis-ethyleniminobenzoquinone (E–39); 1,4-di-methane-sulfoxy-1,4-dimethyl butane (isomyleran); diazoacetyl-L-serine (azaserine); 6-mercaptopurine; diethylamine-, 2,2'-dichloro-N-methyl-, N-oxide hydrochloride (nitromin); 1-aminocyclohexane carboxylic acid (AHA); isonicotinic hydrazide; and gamma-L-glutamylhydrazide. Intraperitoneal injections of aqueous solutions of these chemicals were made on the fifth or sixth day after transplantation of the tumor. In all cases the drug was dissolved directly into isotonic saline before injection, except 2,5-di-n-propoxy-3,6-bis-ethylenimino-benzoquinone (E–39), which was first dissolved in absolute alcohol and then diluted with isotonic saline. At various intervals, samples of tumor ascites cells were removed by peritoneal puncture, stained with acetic dahlia and examined cytologically. Numerical data in each cytological observation was based on approximately 500 interphase and dividing cells from each sample. The results are summarized below and in Table II.

Table II

| Antimitotic agent | Number of injections | Time interval (hours) between injections | Initial dosage (mg./kg.) | Additional dosages (mg./kg.) | Percent mitotic frequency for normal-appearing tumor cells | Time interval (hours) required to cause maximum regression of mitosis in normal-appearing tumor cells | Maximum percent mitotic frequency of abnormal-appearing tumor cells | Minimum percent mitotic frequency of abnormal-appearing tumor cells | Approximate time interval (hours) required to reach minimum mitotic frequency | Number of mice used |
|---|---|---|---|---|---|---|---|---|---|---|
| Sarkomycin | 1 | | 250 | | 3.8 | 1 | 2.3 | 0.1 | 4 | 2 |
| MA and sarkomycin | 1 | | 150 MA / 250 Sark | | 3.8 | 0.5 | 4.7 | 0.1 | 24 | 2 |
| Isomyleran | 1 | | 3 | | 6.8 | 6 | | | | 2 |
| MA and isomyleran | 1 | | 150 MA / 3 Isom | | 4.3 | 4 | | | | 2 |
| Azaserine | 1 | | 10 | | 3.5 | 3 | | | | 3 |
| MA and azaserine | 1 | | 150 MA / 10 Aza | | 3.5 | 3 | 2.5 | 0.1 | 48 | 3 |
| 6-mercaptopurine | 1 | | 50 | | 3.7 | 3 | | | | 3 |
| MA and 6-mercaptopurine | 1 | | 150 MA / 150 6-Merc | | 3.7 | 3 | 3.5 | 0.1 | 3 | 3 |
| Nitromin | 5 | 24 | 15 | 4 x 15 | 5.5 | 51 | | | | 2 |
| MA and nitromin | 5 | 24 | 100 MA / 10 Nitro | 4 x same | 5.5 | 3 | 2.7 | 0.1 | 31 | 2 |
| AHA | 1 | | 500 | | 3.7 | 6 | | | | 2 |
| MA and E-39 | 1 | | 150 MA 5 E-39 | | 4.2 | 1 | 3.0 | 0.1 | 12 | 4 |
| MA / AHA / Sarkomycin / E-39 | | | 150 MA / 500 AHA / 250 Sark / 5 E-39 | | 2.8 | 2 | 1.5 | 0.3 | 6 | 5 |
| MA / E-39 / Sarkomycin / Iso-nicotinic hydrazide | 1 / / 2 / | / / 26 / | 150 MA / 5 E-39 / 250 Sark / 250 I.n.H. | 1 x 250 Sark | 3.0 | 1 | 2.3 | 0.3 | 6 | 5 |
| MA / E-39 / Sarkomycin / α-L-glutamyl hydrazide | / / 2 / | / / 22 / | 100 MA / 3.7 E-39 / 250 Sark / 250 α-L-g.h. | 1 x 3.7 E-39 | 4.8 | 1 | 2.0 | 0.3 | 3 | 27 |
| MA / E-39 / Sarkomycin | 1 / / | / / | 150 MA / 5 E-39 / 250 Sark | | 3.8 | 1 | 2.5 | 0.2 | 6 | 11 |
| MA / E-39 / Sarkomycin | / 2 / | / 8 / | 150 MA / 5 E-39 / 250 Sark | 1 x same | 4.7 | 3 | 3.0 | 0.1 | 24 | 8 |
| MA / E-39 / Sarkomycin | / 1 / | | 100 MA / 5 E-39 / 250 Sark | | 4.7 | 0.5 | 3.4 | 0.1 | 6 | 14 |
| MA / E-39 / Sarkomycin / Chloromycetin | / / 1 / | | 150 MA / 5 E-39 / 250 Sark / 250 Chlor | | 4.7 | 3 | 1.2 | 0.3 | 6 | 3 |
| MA / E-39 / Sarkomycin / Isomyleran | / / 1 / | | 100 MA / 5 E-39 / 250 Sark / 3 Isom | | 0 | 0.5 | | | | 2 |

The terms normal-appearing tumor cell and abnormal-appearing tumor cell as used in Table II denote the difference observed in the appearance of the mitotic cells. The abnormal-appearing tumor cell describes cells in which the cytoplasm had an irregular or abnormal appearance or, wherein the chromosomes and chromatin material formed clumps or otherwise agglutinated, whereas the term normal-appearing tumor cell represents cells which have a normal and regular appearance. In both cases, however, the antimitotic compound changes the environment of the tumor cells, and the tumor cells which visually appear to be normal, may otherwise be abnormal.

Treatment with sarkomycin alone results in a large number of cells with small blisters on the cytoplasmic surfaces shortly after treatment. The mitotic cells, especially at metaphase, showed a marked nuclear abnormality and were characterized by clumping of the chromosomes. Extensive cytoplasmic damage was exhibited by the cells one hour after treatment but, within six hours, regular growth of most of the cells was obtained.

In comparison, combinations of maleuric acid and sarkomycin were effective in arresting mitotic growth for at least twenty-four hours. Within thirty minutes after treatment with the combination of maleuric acid and sarkomycin, the propagation of normal-appearing tumor cells was arrested so that no further mitosis occurred, even to the end of the 24 hour test period. Microscopic inspection of the abnormal-appearing cells revealed the chromosomes to be sticking together. After three hours, the tumor cells still showed chromosome and cytoplasmic abnormalities. Subsequently, the chromosomes were observed to become pycnotic and appeared as a singular chromatin material. The surface of the tumor cells became more ragged following the treatment with the combination of maleuric acid and sarkomycin, than when the tumor cell was treated with maleuric acid alone. However, no tumor cells with ragged-cell surfaces were observed twenty-four hours after treatment, and the mitotic frequency of the tumor cells then approximated zero, representing complete inhibition of mitosis in the tumor cells.

Enhanced synergism is obtained with the combination of maleuric acid and 2,5-di-n-propoxy-3,6-bis-ethyleniminobenzoquinone (E-39) in arresting mitotic frequency of tumor cells than when E-39 is used alone. The total number of cells per unit volume of ascites fluid was also decreased. The combination of compounds caused abnormalities in the interphase or resting cells, and also caused agglutination of the chromatin material. When E-39 was used alone, a reduction in the total number of tumor cells was observed within twenty-four hours but no abnormalities in the cytoplasm or nuclear structures of the surviving cells were observable by light microscopy. This indicates that maleuric acid not only acts in a synergistic manner with other antimitotics but that it prevents mitosis by causing abnormalties in the cytoplasm and chromosomes which results in the effective death of the tumor cells.

Treatment with isomyleran and maleuric acid also caused a decrease in mitotic frequency. No abnormal-appearing cells were observed after treatment with the combination. The mitotic frequency of the normal-appearing tumor cells was reduced to a level of two percent after four hours. The use of isomyleran alone does not cause the information of any abnormal-appearing tumor cells in marked contrast to the results obtained when maleuric acid is employed. It is significant to point out that utilization of the combinations of isomyleran with maleuric acid are more effective than isomyleran alone over longer periods of time due to the greater chronic toxicity of isomyleran.

A more striking use of the combination of maleuric acid and isomyleran is a combination of maleuric acid, 2,5 - di-n-propoxy - 3,6 - bis - ethyleniminobenzoquinone (E–39), sarkomycin and isomyleran. The number of normal-appearing tumor cells in mitosis was substantially completely arrested over a time interval lasting from thirty minutes to twelve hours.

The use of combinations of maleuric acid and azaserine in treating Ehrlich ascites tumor cells is more effective in reducing the number of mitotic divisions of tumor cells than the use of azaserine alone. The use of a combination of maleuric acid and azaserine shows that, over the time interval of three to twenty-four hours, substantially complete arrest of mitosis of normal-appearing tumor cells is obtained; whereas the use of azaserine alone causes an inhibition of mitosis significantly inferior to that caused by the use of the combination. The appearance of the treated tumor cells having abnormal characteristics was substantially the same as observed when maleuric acid was used alone.

Treatment with combinations of maleuric acid and 6-mercaptopurine showed a marked improvement in inhibiting mitosis compared with the use of 6-mercaptopurine alone. As in the case of azaserine no abnormal-appearing mitotic cells were observed when 6-mercaptopurine was used alone. However, the combination was effective in producing abnormal-appearing mitotic cells characterized by agglutination of the chromatin material and apparent stickness of the chromosomes. The normal-appearing tumor cells were reduced to less than 0.5% over the entire time interval of from three to twenty-four hours, and represented a much enhanced inhibition as compared with the use of 6-mercaptopurine alone.

The combination of maleuric acid and nitromin caused a remarkable inhibition in the mitosis of normal-appearing tumor cells for periods up to 120 hours. Combinations of maleuric acid and nitromin were also effective in producing abnormal-appearing tumor cells which after three hours reached a mitotic frequency of almost 3%, but were gradually arrested until at 32 hours no further abnormal-appearing tumor cells were observed. In contrast, the use of nitromin alone, while relatively effective to arrest mitosis in tumor cells, did not produce any abnormal-appearing tumor cells nor was the inhibition of mitosis regular or substantially complete over the period of the experiment.

The use of a combination of maleuric acid, 1-amino-cyclohexane carboxylic acid (AHA), sarkomycin and 2,5-di-n-propoxy - 3,6-bis-ethyleniminobenzoquinone (E–39) in arresting mitosis was effective in producing abnormal-appearing tumor cells, whereas no such tumor cells were observed when AHA was used alone. Substantially complete inhibition of mitosis was obtained with this combination over the time interval of six to twenty-four hours.

A combination of maleuric acid, E–39 and sarkomycin had an effect on the mitosis of tumor cells similar to that observed following treatment with either maleuric acid alone, or a combination of maleuric acid with E–39 or sarkomycin. Damage to tumor cells was observed within one hour after an injection of this combination into mice previously implanted with $5 \times 10^6$ tumor cells for a period of six days. During the course of observation, no prophase cells were observed to undergo any physical change in the early stages of treatment, whereas the division of almost all cells was blocked at metaphase. Individual chromosomes were difficult to recognize in the metaphase because of agglutination, and some chromosomes were observed to be scattered around the poles of the cells. The chromosomes scattered around the poles of the cells showed two clear chromatids which indicated an early metabolism of the antimitotic combination in the chromosomes before they could divide. During the time interval of from one to six hours, blisters were observed on the cell surfaces of about 60 percent of the interphase cells. Progressive coagulation of the chromosomes in the cells was observed with increases in time. Micronuclei began to form in the tumor cells up to twelve hours after injection. No normal-appearing or abnormal-appearing tumor cells were observed over the time interval of from twelve to twenty-four hours. This condition of substantially complete inhibition of mitosis continued until seventy-two hours after injection.

The effect of a second injection of the last-described maleuric acid combination is also shown in Table II, where the second injection was made eight hours after the initial injection. The second injection did not appear to have any enhanced antimitotic effects on either the normal-appearing or the abnormal-appearing tumor cells, and did not effect any decrease in the time interval after treatment to substantially arrest mitosis of the normal-appearing tumor cell. Reducing the dosage of maleuric acid from 150 milligrams per kilogram of animal body weight to 100 milligrams per kilogram did not appreciably enhance the antimitotic effect of the combination on the abnormal-appearing cells; however, a more effective regression in mitosis of the normal-appearing cells was obtained.

Results obtained from adding another antimitotic compound to the three-component system of maleuric acid, E–39, and sarkomycin are also shown in Table II. Isonicotinic hydrazide, gamma-L-glutamylhydrazide, chloromycetin, and isomyleran were added to the three-component mixture and injected into animals having similar transplanted tumors. The results obtained using these four-component mixtures were substantially the same as obtained with the three-component mixtures with similar abnormalities being observed in the chromosomes and cytoplasm of the cells.

EXAMPLE 5

Further demonstration of the effectiveness of maleuric acid (MA) to kill tumor cells was obtained by transplanting MA-treated Ehrlich ascites tumor cells obtained from a 20-gram C–57 black mouse into another 20-gram C–57 black mouse by the following method.

Seven C–57 black mice had previously been implanted with Ehrlich ascites tumor cells for six days and then treated with a mixture containing three milligrams of maleuric acid, one-tenth of a milligram of 2,5-di-n-propoxy-3,6-bis-ethyleniminobenzoquinone, and five milligrams of sarkomycin. A second dose of this mixture was given after a twelve-hour interval. Six hours after the second injection, samples of ascites fluid were removed from each of the seven mice. Each sample was then injected intraperitoneally into two new hosts. There was no evidence in any of the fourteen recipient animals of renewed mitosis or tumor growth, although the tumor cells persisted for as long as four days. After five days no tumor cells remained in the new hosts.

Transplantation of ascites fluid containing Ehrlich tumor cells obtained from seven animals that had not been treated with the above anti-mitotic mixture to fourteen new hosts was carried out as a control for this experiment. All fourteen animals showed a rapid, fatal tumor growth and died within twenty days after transplanting. Therefore, it appears that tumor cells, which have been treated with an anti-mitotic mixture of this invention have lost any ability to grow or multiply in susceptible animals. The ascites fluid of the mice which were implanted with MA-treated tumor cells did show some interphase tumor cells during the first five to six days after transplantation. However, no mitotic cells were observed. The interphase cells in the peritoneal cavities of the new host retained the same morphological features they had before transplantation; for example, the cells showed substantially the same type of chromatin coagulation as was observed in the mice originally treated. The size of the tumor cells appeared to be larger in the mice receiving the MA-treated ascites tumor cells than those observed in the controls. After several days the tumor cells gradually disappeared from the peritoneal cavity and leukocytes were observed to increase in number; five to six days after transplanting, only small cells with small nuclei were observed which were presumably all leukocytes.

A subsequent transplantation of Ehrlich ascites tumor cells, sixty days after the original transplanation caused an ordinary growth process of the tumor with uniformly fatal results within fifteen days.

EXAMPLE 6

The nature of the reaction of maleuric acid in cellular metabolic processes was determined by comparing Ehrlich ascites tumor cells which had been treated respectively with uridine, orotic acid, aspartic acid and combinations of maleuric acid with these compounds, as shown in Table III. A single peritoneal injection of these agents was made into mice five days after a transplantation of $5 \times 10^6$ Ehrlich ascites tumor cells. The results represent the number of tumor cells in mitosis based upon a statistical count of at least 500 cells for each peritoneal puncture.

ing this period, averaging from 4 percent at three hours to 7 percent at ten hours. However, the significance of this large number of abnormal-appearing tumor cells in propagation of further tumor cells is diminished, since these cells are incapable of further regular division into daughter cells. At the end of twenty-two hours, the amount of abnormal-appearing tumor cells dropped to less than one percent.

Treatment with a combination of maleuric acid and orotic acid showed an effective inhibition of cell metabolism and substantially complete absence of normal-appearing tumor cells over the time interval of three to twenty-four hours. The number of abnormal-appearing tumor cells increased progressively over the entire time interval. However, the proportionate number of abnormal-appearing tumor cells to total cells counted always remained less than three percent.

The treatment with a three-component mixture of maleuric acid, uridine and orotic acid gave results which were similar to those obtained with the two-component mixture of maleuric acid and orotic acid.

These results show that maleuric acid is entering into maleuric acid synthesis in competition with the structually similar orotic acid, precursor of desoxyribonucleic acid.

Ehrlich ascites tumor cells were treated with L-aspartic acid and also with a mixture of maleuric acid and L-aspartic acid. No abnormal-appearing tumor cells were observed in treating the cells with L-aspartic acid alone. The proportionate number of normal-appearing tumor cells increased with time after injection of L-aspar- Table III

| Physiological agent | Dosage (mg./kg.) | Percent mitotic frequency for normal-appearing tumor cell | Time interval required to cause maximum regression of mitosis in normal-appearing tumor cells, hours | Maximum percent mitotic frequency of treated tumor cells | Minimum percent mitotic frequency of abnormal-appearing tumor cells | Approximate time interval required to reach minimum mitotic frequency, hours |
|---|---|---|---|---|---|---|
| Control | | 4.3 | | | | |
| Uridine | 250 | 4.3 | | 9.9 | None observed | |
| Orotic acid | 250 | 4.3 | | 6 | do | |
| Maleuric acid and uridine | 150 maleuric acid, 250 uridine | 4.5 | 5 | 7.1 | 0.5 | 22 |
| Maleuric acid and orotic acid | 150 maleuric acid, 250 orotic acid | 3.4 | 6 | 2.5 | | |
| Maleuric acid and uridine and orotic acid | 150 maleuric acid, 250 uridine, 250 orotic acid | 4.5 | 7 | 3.5 | | |
| L-aspartic acid | 250 | 3.5 | | 9.5 | None observed | |
| Maleuric acid and L-aspartic acid | 150 maleuric acid, 250 L-aspartic acid | 3.5 | 12 | 5 | 3 | 24 |

The percent mitotic frequency of untreated tumor cells was used as a control and found to increase steadily from about 4.3 percent immediately after transplantation to about 6 percent twenty-two hours later. Both the treatment with orotic acid and uridine alone caused an increase over the twenty-two hour test interval in the mitotic frequency of normal-appearing tumor cells over that noted in the control, a greater increase being obtained with uridine over this entire interval than was observed at any time with orotic acid. No abnormal-appearing tumor cells were observed.

Both normal-appearing and abnormal-appearing tumor cells were observed following treatment of ascitic tumor cells with a combination of maleuric acid and uridine. The abnormal-appearing cells showed the characteristic chromosome or cytoplasm irregularities similarly observed when the tumor cells were treated with maleuric acid alone. The combination of maleuric acid and uridine caused a marked decrease in the number of normal-appearing mitotic cells when compared with uridine alone. This effect was most significant over the time interval of from three to ten hours during which time mitotic frequency averaged only one percent. A very large number of abnormal-appearing tumor cells was obtained durtic acid, until a maximum of 9.5 percent was reached after twelve hours.

The mixture of maleuric acid and L-aspartic acid caused a pronounced decrease in the number of normal-appearing tumor cells, and after three hours, no further normal-appearing tumor cells were observed up to twenty-four hours. The presence of maleuric acid caused agglutination of the chromatin material with consequent formation of abnormally-appearing tumor cells. These cells persisted over the entire range of the twenty-four hour experiment with a maximum five percent being observed after twelve hours.

The results of this example demonstrate the effectiveness of maleuric acid in blocking the metabolism of tumor cells.

EXAMPLE 7

Approximately $5 \times 10^6$ Ehrlich ascites tumor cells were transplanted into C-57 black mice averaging twenty grams in weight. Four days later, the mice were injected intraperitoneally with thirty-three microcuries of tritiated thymidine (T-H$^3$) having a specific activity of 360 mc./mM. contained in 0.1 ml. normal saline solution. After one hour, samples of tumor cells were removed by peritoneal puncture at different intervals up to 24 hours and smeared onto autoradiographic films for the preparation of autoradiographs. The autoradiographs were used to measure the amount of T-H³ incorporated into the desoxyribonucleic acid of the cells for the purpose of identifying and labelling cells undergoing various stages of mitosis.

After one hour, approximately 40 percent of the interphase cells were labelled; thenceforth up to 24 hours, the percentage of labelled interphase cells increased to about 50 percent. The minimal period for incorporation of T-H³ into the desoxyribonucleic acid of cells undergoing mitosis was approximately 3 hours. In the 3-hour sample, 2.6 percent of the mitotic cells were labelled, while at 4 hours the percentage increased to 12 percent. Maximum labelling of approximately 80 percent of the mitotic cells was attained in 12 hours.

The above procedure was repeated on two groups of mice with the following modifications: a dose of 5.0 mg. of maleuric acid (MA) in 0.5 ml. normal saline solution was injected intraperitoneally into one group of mice 30 minutes after the injection of T-H³, the other group was injected intraperitoneally with an identical dose of maleuric acid 4.5 hours after the T-H³ injection. The approximate results are tabulated in Table IV.

Table IV

| Hours after T-H³ injection | Percent labelled interphase cells ||| Percent labelled mitotic cells |||
|---|---|---|---|---|---|---|
| | Control | MA injection 30 min. after T-H³ | MA injection 4.5 hrs. after T-H³ | Control | MA injection 30 min. after T-H³ | MA injection 4.5 hrs. after T-H³ |
| 1 | 40 | | | 0 | 0 | |
| 3 | | 45 | | 2.6 | 0 | |
| 4 | 43 | | | 12 | | |
| 6 | 45 | 35 | 38 | 60 | 0 | 42 |
| 8 | 40 | | 38 | 70 | | 25 |
| 10 | 42 | | | | | 37 |
| 12 | 46 | 25 | 30 | 80 | 0 | 32 |
| 24 | 50 | 30 | 40 | 80 | 0 | |

When maleuric acid (MA) was injected both 30 minutes and 4.5 hours after the T-H³ injection, the percent of labelled interphase cells decreased progressively from the control level, the decrease being more pronounced when only 30 minutes lapsed between the two injections. When the injection of MA followed that of T-H³ by 30 minutes, not a single labelled mitotic cell was observed in any of the samples studied during the 24-hour test period. When MA was injected 4.5 hours after the injection of T-H³, the progression of labelled interphase cells into mitosis soon ceased even though labelled interphase cells were entering mitosis at a rapid rate at the time of injection of maleuric acid.

These results illustrate the effect of subsequent injections of maleuric acid on the incorporation of T-H³ into tumor cells. The results show that maleuric acid inhibits the progression of interphase cells into mitosis and effectively inhibits the growth of any tumor cells.

EXAMPLE 8

The effect of pretreatment with maleuric acid (MA) on the incorporation of tritiated thymidine (T-H³) into desoxyribonucleic acid taking place in interphase ascites tumor cells was determined by contacting the tumor cells with MA at different times prior to the injection of T-H³. A dose of 5.0 mg. of MA in 0.51 ml. normal saline solution was injected intraperitoneally into C–57 black mice 30 minutes, 3 hours, and 24 hours prior to the T-H³ injection. After the T-H³ injection, samples of tumor cells were removed by peritoneal puncture at different intervals up to 24 hours. The percentage of labelled interphase cells found are tabulated in Table V.

Table V

| Number of hours after T-H³ injection | Percent labelled interphase cells ||||
|---|---|---|---|---|
| | Control | 30 min. MA pretreatment | 3 hr. MA pretreatment | 24 hr. MA pretreatment |
| 1 | 44 | 0 | | 0 |
| 3 | 45 | 0 | 2 | 0 |
| 6 | 51 | 0 | 15 | 7 |
| 10 | | 0 | 20 | |
| 24 | 47 | | 0 | |

These results show that maleuric acid effectively inhibits the incorporation of thymidine into desoxyribonuclesic acid, thereby preventing the synthesis of desoxyribonucleic acid. Further, maleuric acid blocks the interphase cells from undergoing mitosis, thereby inhibiting the growth of tumor cells.

The foregoing detailed description has been given for clearness of understanding only and no necessary limitations are to be understood therefrom. The invention is not limited to the exact details shown and described for obvious modifications will occur to those skilled in the art.

Having thus described my invention, I claim:

1. A chemotherapeutic composition for inhibiting mitosis of tumor cells comprising a mixture of monomaleylurea and 2,5 di-n-propoxy-3,6-bis-ethyleniminobenzoquinone.

2. A method for inhibiting mitosis of malignant tumor cells which comprises contacting a malignant tumor cell with a mixture of monomaleylurea and a compound selected from the group consisting of 2,5 di-n-propoxy-3,6-bis-ethyleniminobenzoquinone; diethylamine, 2,2'-dichloro-N-methyl-, N-oxide, hydrochloride; gamma-L-glutamylhydrazide; 1-aminocyclohexane carboxylic acid; diazo-acetyl-L-serine; 1,4-dimethanesulfoxy-1,4-dimethylbutane; isonicotinic hydrazide; 6-mercaptopurine, and 2-methylenecyclopentanone-3-carboxylic acid.

3. A chemotherapeutic composition for inhibiting mitosis of tumor cells comprising a mixture of monomaleylurea and diethylamine, 2,2'-dichloro-N-methyl-, N-oxide, hydrochloride.

4. A chemotherapeutic composition for inhibiting mitosis of tumor cells comprising a mixture of monomaleylurea and gamma glutamylhydrazide.

5. A chemotherapeutic composition for inhibiting mitosis of tumor cells comprising a mixture of monomaleylurea and 1-aminocyclohexane carboxylic acid.

6. A chemotherapeutic composition for inhibiting mitosis of tumor cells comprising a mixture of monomaleylurea and diazo-acetyl-L-serine.

7. A chemotherapeutic composition for inhibiting mitosis of tumor cells comprising a mixture of monomaleylurea and 1,4-dimethanesulfoxy-1,4-dimethylbutane.

8. A chemotherapeutic composition for inhibiting mitosis of tumor cells comprising a mixture of monomaleylurea and isonicotinic hydrazide.

9. A chemotherapeutic composition for inhibiting mitosis of tumor cells comprising a mixture of monomaleylurea and 6-mercaptopurine.

10. A chemotherapeutic composition for inhibiting mitosis of tumor cells comprising a mixture of monomaleylurea and 2-methylene-cyclopentanone-3-carboxylic acid.

11. A process for inhibiting desoxyribonucleic acid synthesis in malignant tumor cells which comprises contacting a malignant tumor cell with monomaleylurea and a pharmaceutical carrier.

12. A method for inhibiting mitosis of malignant tumor cells which comprises contacting a malignant tumor cell with monomaleylurea, said maleuric acid having an effective concentration of from about 1 to about 5 milligrams for every $5 \times 10^6$ tumor cells.

13. A method for inhibiting mitosis of malignant tumor cells which comprises contacting a malignant tumor cell with monomaleylurea and a pharmaceutical carrier.

14. A method for inhibiting mitosis of malignant tumor cells which comprises contacting a malignant tumor cell with a mixture of monomaleylurea and a compound selected from the group consisting of 2,5 di-n-propoxy-3,6-bis-ethyleniminobenzoquinone; diethylamine, 2,2'-dichloro-N-methyl-, N-oxide, hydrochloride; gamma-L-glutamylhydrazide; 1-aminocyclohexane carboxylic acid; diazo-acethyl-L-serine; 1,4-dimethanesulfoxy-1,4-dimethylbutane; isonicotinic hydrazide; 6-mercaptopurine; and 2-methylenecyclopentanone-3-carboxylic acid; said monomaleylurea having an effective concentration of from about 1 to 5 milligrams for every $5 \times 10^6$ tumor cells.

15. A method for inhibiting mitosis of malignant tumor cells which comprises contacting a malignant tumor cell with a mixture of monomaleylurea and 2,5 di-n-propoxy-3,5-bis-ethyleneiminobenzoquinone, said monomaleylurea having an effective concentration of from about 1 to about 5 milligrams for every $5 \times 10^6$ tumor cells.

16. A method for inhibiting mitosis of malignant tumor cells which comprises contacting a malignant tumor cell with a mixture of monomaleylurea and 2,5 di-n-propoxy-3,6-bis-ethyleniminobenzoquinone, said maleuric acid having an effective concentration of from 1 to about 5 milligrams for every $5 \times 10^6$ tumor cells.

17. A method for inhibiting mitosis of malignant tumor cells which comprises contacting a malignant tumor cell with a mixture of monomaleylurea and diethylamine, 2,2-dichloro-N-methyl-, N-oxide, hydrochloride, said monomaleylurea having an effective concentration of from 1 to about 5 milligrams for every $5 \times 10^6$ tumor cells.

18. A method for inhibiting mitosis of malignant tumor cells which comprises contacting a malignant tumor cell with a mixture of monomaleylurea and γ-L-glutamylhydrazide, said monomaleylurea having an effective concentration of from about 1 to 5 milligrams for every $5 \times 10^6$ tumor cells.

19. A method for inhibiting mitosis of malignant tumor cells which comprises contacting a malignant tumor cell with a mixture of monomaleylurea and 1-aminocyclohexane carboxylic acid, said monomaleylurea having an effective concentration of from about 1 to about 5 milligrams for every $5 \times 10^6$ tumor cells.

20. A method for inhibiting mitosis of malignant tumor cells which comprises contacting a malignant tumor cell with a mixture of monomaleylurea and 1,4-dimethanesulfoxy-1,4-dimethylbutane, said monomaleylurea having an effective concentration of from about 1 to about 5 milligrams for every $5 \times 10^6$ tumor cells.

21. A method for inhibiting mitosis of malignant tumor cells which comprises contacting a malignant tumor cell with a mixture of monomaleylurea and isonicotinic hydrazide, said monomaleylurea having an effective concentration of from about 1 to about 5 milligrams for every $5 \times 10^6$ tumor cells.

22. A method for inhibiting mitosis of malignant tumor cells which comprises contacting a malignant tumor cell with a mixture of monomaleylurea and 6-mercaptopurine, said monomaleylurea having an effective concentration of from about 1 to about 5 milligrams for every $5 \times 10^6$ tumor cells.

23. A method for inhibiting mitosis of malignant tumor cells which comprises contacting a malignant tumor cell with a mixture of monomaleylurea and 2-methylenecyclopentanone-3-carboxylic acid, said monomaleylurea having an effective concentration of from about 1 to about 5 milligrams for every $5 \times 10^6$ tumor cells.

References Cited in the file of this patent
UNITED STATES PATENTS 2,753,347    Miller et al. _____ July 3, 1956

OTHER REFERENCES

Skipper et al.: Cancer Research, February 1951, pp. 109–112.

Chem. Abst., vol. 27, 1933, page 3452.

Chem. Abst., 1957, pages 6736h and 14087–14088.

UNITED STATES PATENT OFFICE
CERTIFICATE OF CORRECTION

Patent No. 3,105,009　　　　　　　　September 24, 1963

Eugene Roberts

It is hereby certified that error appears in the above numbered patent requiring correction and that the said Letters Patent should read as corrected below.

Column 14, line 47, for "gamma glutamylhydrazide" read -- gamma-L-glutamylhydrazide --; line 72, for "maleuric acid" read -- monomaleylurea --.

Signed and sealed this 12th day of January 1965.

(SEAL)
Attest:

ERNEST W. SWIDER
Attesting Officer

EDWARD J. BRENNER
Commissioner of Patents